United States Patent
Nakamura

(10) Patent No.: US 9,344,693 B2
(45) Date of Patent: May 17, 2016

(54) DRIVE CONTROL APPARATUS AND DRIVE CONTROL METHOD, AND VIDEO OUTPUT APPARATUS

(71) Applicant: Sony Corporation, Tokyo (JP)

(72) Inventor: Masashi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 254 days.

(21) Appl. No.: 14/054,866

(22) Filed: Oct. 16, 2013

(65) Prior Publication Data

US 2014/0125873 A1    May 8, 2014

(30) Foreign Application Priority Data

Nov. 8, 2012  (JP) ................. 2012-246647

(51) Int. Cl.
*H04N 9/31*    (2006.01)

(52) U.S. Cl.
CPC ............ *H04N 9/312* (2013.01); *H04N 9/3135* (2013.01)

(58) Field of Classification Search
CPC .......................................... H04N 9/31–9/3197
USPC ............... 345/204–214, 690–699; 359/198.1
See application file for complete search history.

(56) References Cited

U.S. PATENT DOCUMENTS

| | | | | |
|---|---|---|---|---|
| 7,884,816 B2* | 2/2011 | Burroughs | ........... | G02B 26/101 345/213 |
| 2008/0144150 A1* | 6/2008 | Champion | ............. | G09G 3/025 359/199.1 |
| 2009/0001272 A1* | 1/2009 | Hajjar | .................... | G02B 26/10 250/354.1 |
| 2010/0097678 A1* | 4/2010 | Hajjar | .................... | G01J 3/506 359/198.1 |
| 2010/0315552 A1* | 12/2010 | Rothaar | ............... | G02B 26/085 348/512 |
| 2011/0012874 A1* | 1/2011 | Kurozuka | ............ | G02B 26/105 345/204 |
| 2011/0116054 A1* | 5/2011 | Wakabayashi | ......... | G03B 21/14 353/36 |
| 2011/0249020 A1* | 10/2011 | Brown | ..................... | G09G 3/02 345/606 |
| 2011/0249241 A1* | 10/2011 | Wakabayashi | ....... | G02B 26/085 353/46 |
| 2011/0267361 A1* | 11/2011 | Kurozuka | ............ | G02B 26/101 345/531 |

FOREIGN PATENT DOCUMENTS

JP    2006-189573    7/2006

* cited by examiner

*Primary Examiner* — Dmitriy Bolotin
(74) *Attorney, Agent, or Firm* — Michael Best & Friedrich LLP

(57) ABSTRACT

There is provided a drive control apparatus that includes a horizontal control section, and a vertical control section. The horizontal control section controls a scanning mirror for horizontal scanning with laser light, the scanning mirror being driven at a fixed frequency in a horizontal direction. The vertical control section controls the scanning mirror for vertical scanning based on the frequency at which the horizontal control section drives the scanning mirror in the horizontal direction, the vertical control section outputting a vertical drive signal to control the scanning mirror for vertical scanning, the vertical drive signal including an interval in which the laser light is directed vertically from top to bottom and an interval in which the laser light is directed vertically from bottom to top, the intervals alternately producing an output of a predetermined amount.

11 Claims, 14 Drawing Sheets

DRIVE CONTROL APPARATUS AND DRIVE CONTROL METHOD, AND VIDEO OUTPUT APPARATUS

CROSS REFERENCE TO RELATED APPLICATIONS

This application claims the benefit of Japanese Priority Patent Application JP 2012-246647 filed Nov. 8, 2012, the entire contents of which are incorporated herein by reference.

BACKGROUND

The present disclosure relates to a drive control apparatus and method, and a video output apparatus and, more specifically, to a drive control apparatus and method, and a video output apparatus that may reduce any effect to be caused by a mechanical resonance frequency of a scanning mirror.

There has previously been a laser-scanning projection apparatus that projects video on a screen by driving a micro mirror at a high speed to reflect laser light for scanning. As an example, refer to Japanese Patent Application Laid-open No. 2006-189573.

SUMMARY

With a projection apparatus using a laser light source, the method called raster scanning is generally used for laser scanning. With the raster scanning, every frame is rendered from top to bottom so that, for vertical scanning using a scanning mirror, after the completion of rendering on a frame, the laser light is expected to return from the lower end of the scanning path to the upper end thereof before the start of rendering on the next frame.

The concern here is that if the frequency during this return movement gets close to the mechanical resonance frequency of the scanning mirror, the scanning mirror is affected by the mechanical resonance frequency, thereby resulting in a predetermined length of time for the scanning mirror to be static, for example.

It is thus desirable to reduce any effect to be caused by the mechanical resonance frequency of the scanning mirror.

According to an embodiment of the present disclosure, there is provided a drive control apparatus including a horizontal control section, and a vertical control section. The horizontal control section is configured to control a scanning mirror for horizontal scanning with laser light, the scanning mirror being driven at a fixed frequency in a horizontal direction. The vertical control section is configured to control the scanning mirror for vertical scanning based on the frequency at which the horizontal control section drives the scanning mirror in the horizontal direction, the vertical control section outputting a vertical drive signal to control the scanning mirror for vertical scanning, the vertical drive signal including an interval in which the laser light is directed vertically from top to bottom and an interval in which the laser light is directed vertically from bottom to top, the intervals alternately producing an output of a predetermined amount.

According to an embodiment of the present disclosure, there is provided a drive control method including controlling a scanning mirror for horizontal scanning with laser light, the scanning mirror being driven at a fixed frequency in a horizontal direction, controlling the scanning mirror for vertical scanning based on the frequency at which the scanning mirror is driven in the horizontal direction, and producing an output of a predetermined amount alternately in two types of intervals in a vertical drive signal, the vertical drive signal being output to control the scanning mirror for vertical scanning, one type of the intervals showing the laser light directed vertically from top to bottom, the other type of the intervals showing the laser light directed vertically from bottom to top.

According to an embodiment of the present disclosure, there is provided a video output apparatus including a laser light source, a scanning mirror, a horizontal control section, and a vertical control section. The laser light source is configured to generate laser light. The scanning mirror is configured to reflect the laser light coming from the laser light source, the laser light being used for two-dimensional scanning. The horizontal control section is configured to control the scanning mirror for horizontal scanning, the scanning mirror being driven at a fixed frequency in a horizontal direction. The vertical control section is configured to control the scanning mirror for vertical scanning based on the frequency at which the horizontal control section drives the scanning mirror in the horizontal direction, the vertical control section outputting a vertical drive signal to control the scanning mirror for vertical scanning, the vertical drive signal including an interval in which the laser light is directed vertically from top to bottom and an interval in which the laser light is directed vertically from bottom to top, the intervals alternately producing a video output on a frame basis.

According to an embodiment of the present disclosure, a scanning mirror is controlled for horizontal scanning with laser light so as to be driven at a fixed frequency in a horizontal direction. Based on the frequency at which the scanning mirror is driven in the horizontal direction, the scanning mirror is controlled for vertical scanning. A vertical drive signal is output to control the scanning mirror for vertical scanning. The vertical drive signal includes an interval in which the laser light is directed vertically from top to bottom, and an interval in which the laser light is directed vertically from bottom to top. These intervals alternately produce an output of a predetermined amount.

According to an embodiment of the present disclosure, any effect to be caused by the mechanical resonance frequency of a scanning mirror may be reduced.

These and other objects, features and advantages of the present disclosure will become more apparent in light of the following detailed description of best mode embodiments thereof, as illustrated in the accompanying drawings.

DETAILED DESCRIPTION OF EMBODIMENT

Hereinafter, an embodiment of the present disclosure will be described with reference to the drawings.

Prior to describing a specific embodiment with the application of the present technology, raster scanning in a previous projection apparatus is described.

Figure 1:
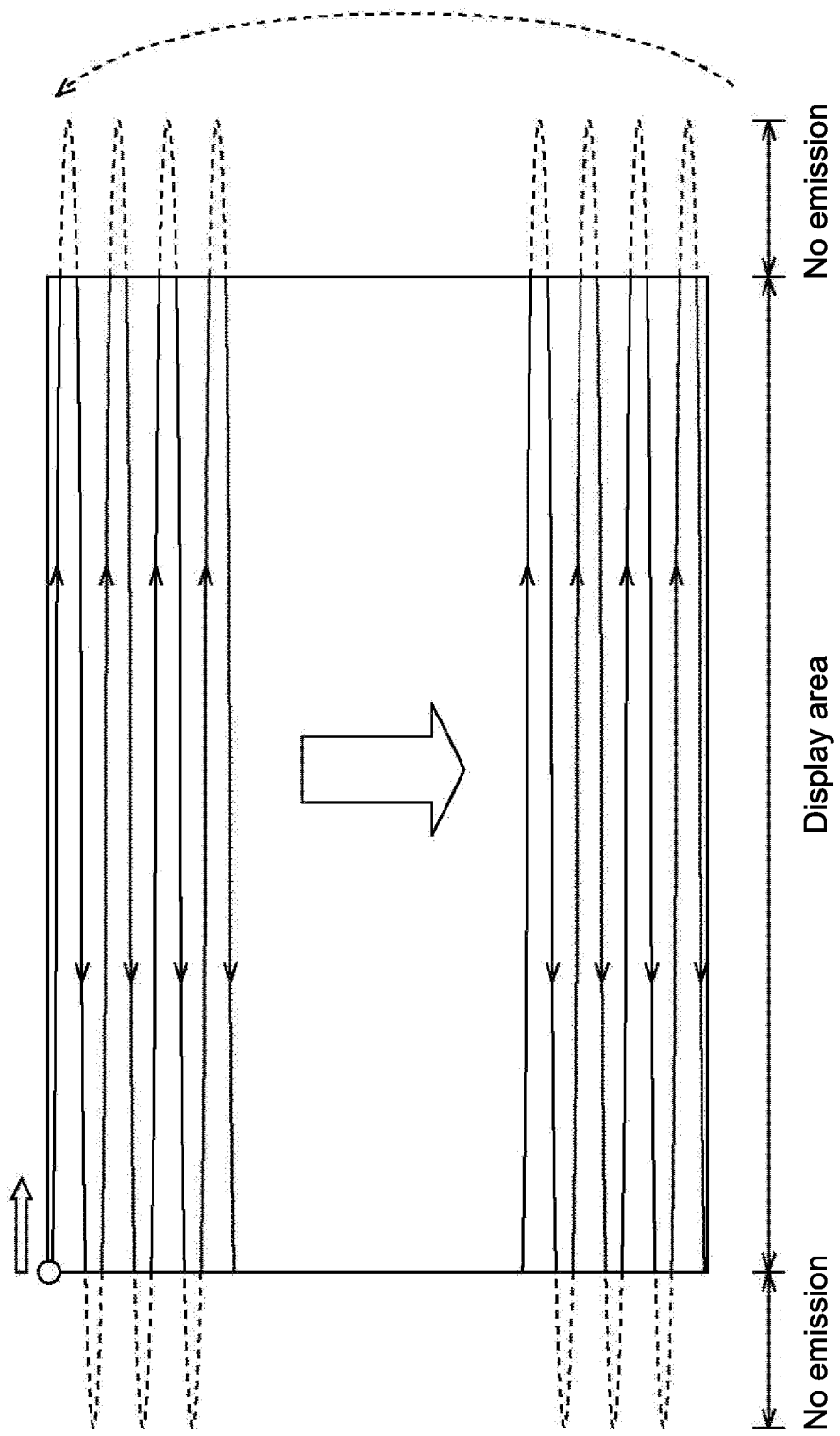
FIG. 1 is a diagram illustrating previous raster scanning.

As shown in FIG. 1, with raster scanning, laser light gradually moves vertically downward while scanning horizontally in two directions so that two-dimensional video is produced. The laser light is emitted in a display area where the video is displayed, but is not emitted at right and left end portions where the laser light turns back. After the completion of rendering on a frame, when the laser light moves back to the upper end of the scanning path from the lower end thereof, the laser light is not emitted.

As such, with raster scanning, every frame is rendered from top to bottom so that, for vertical scanning using a scanning mirror after the completion of rendering on a frame, the laser light is expected to return from the lower end of the scanning path to the upper end thereof before the start of rendering on the next frame. Therefore, a frame is configured by a blanking interval for this return movement and a display interval for display of the video.

Figure 2:
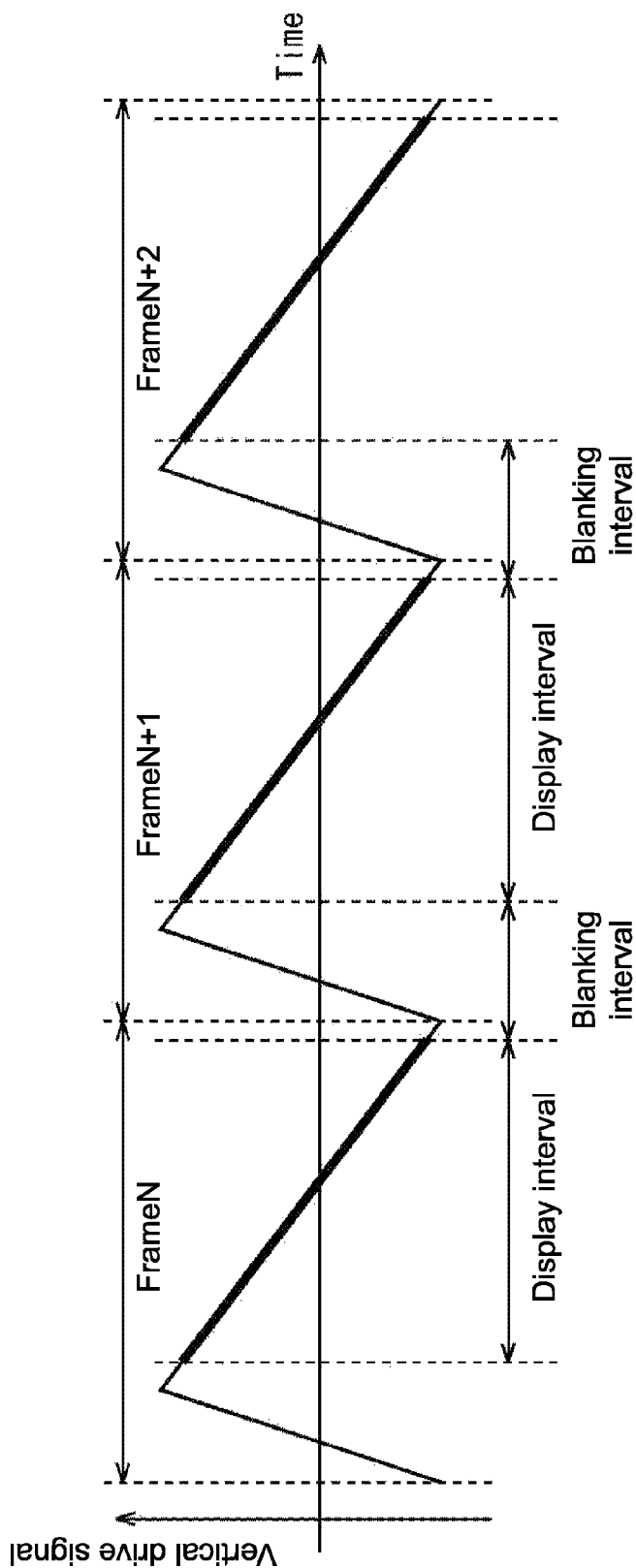
FIG. 2 is a diagram showing a vertical drive signal for vertical scanning using a previous scanning mirror.

FIG. 2 shows a vertical drive signal for vertical scanning using a scanning mirror.

As shown in FIG. 2, the waveform of the vertical drive signal is sawtooth because the blanking interval for the return movement from the lower to upper end of the scanning path with no emission of laser light is shorter than the display interval for display of video with emission of the laser light.

Such a large change of amplitude from the lower to upper end in the return movement may be greatly affected by mechanical resonance resulting from the configuration of the scanning mirror, and by the inertia of the high-speed movement thereof. The waveform when the scanning mirror is driven is triangular in which a slew rate (≅approximately equal to 1/frequency) varies between the blanking interval and the display interval. That is, the frequency in the display interval is close to the approximate frame frequency, but the frequency in the blanking interval is several times more than the frame cycle because the blanking interval is expected to be short. As an example, the frequency Fb of the vertical drive signal when the blanking interval is N % of a frame time is Fb=Fframe/N, where Fframe denotes the frame frequency.

Figure 3A:
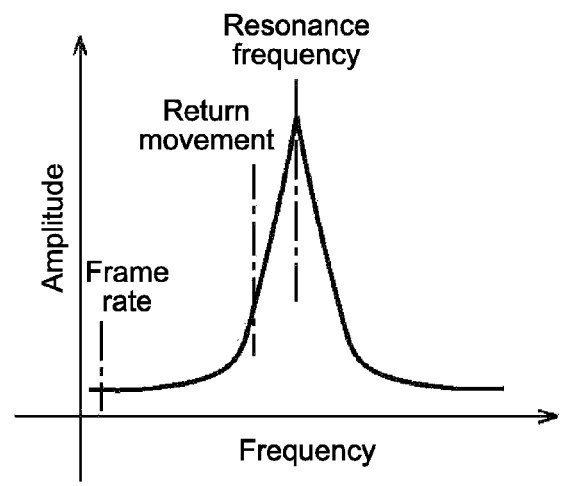
FIGS. 3A and 3B are diagrams respectively illustrating the frequency response of the scanning mirror and the scanning path thereof.
Figure 3B:
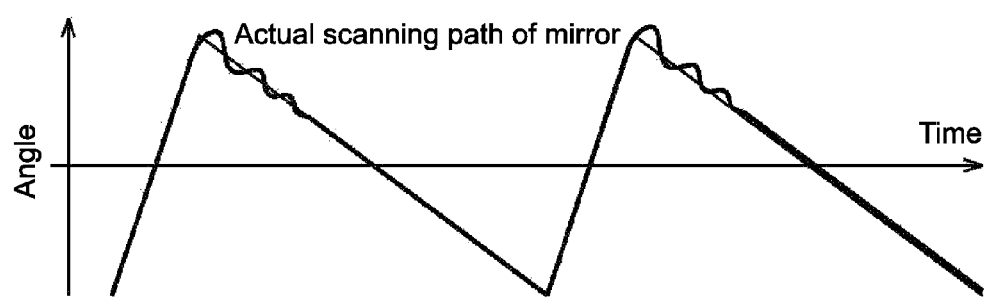

The mechanical resonance frequency of the scanning mirror is generally designed to be higher than the frame frequency. However, an attempt to reduce the blanking interval brings the frequency in the return movement close to the mechanical resonance frequency of the scanning mirror as shown in FIG. 3A. If this is the case, the movement of the scanning mirror is added with resonance components so that, as the scanning path of the actual scanning mirror shown in FIG. 3B, this results in a longer time for the scanning mirror to be static. Accordingly, in order to start rendering all of the frames at the same position, the scanning mirror is expected to be fully still before scanning is resumed.

As such, reducing the blanking interval has been difficult due to the effect caused by the mechanical resonance frequency of the scanning mirror. In order to reduce the effect caused by the mechanical resonance frequency of the scanning mirror, some measures have been taken to prevent the scanning mirror from vibrating, e.g., removing mechanical resonance frequency components from the waveform when the scanning mirror is driven, or detecting vibration components for feedback control. For these measures, however, every scanning mirror is expected to be adjusted with attention to detail. Therefore, there are limitations to reduce the time taken for the scanning mirror to be static. What is more, the return movement is with speed and large amplitude so that the scanning mirror is to be driven with opposite-direction damping components to be static, and this adjustment is difficult.

On the other hand, when the time for the return movement is set long, the display interval is accordingly shortened, thereby resulting in a fewer number of scanning lines during the interval for video output. This resultantly degrades the resolution of the video. This also reduces the light-emission efficiency in a frame time, thereby reducing the brightness of the video to be projected. Therefore, setting long the time for the return movement is not desirable, and there thus is a demand for reducing the effect caused by the mechanical resonance frequency of the scanning mirror with the return movement set to be short.

In the below, the specific embodiment with the application of the present technology is described in detail by referring to the accompanying drawings.

Figure 4:
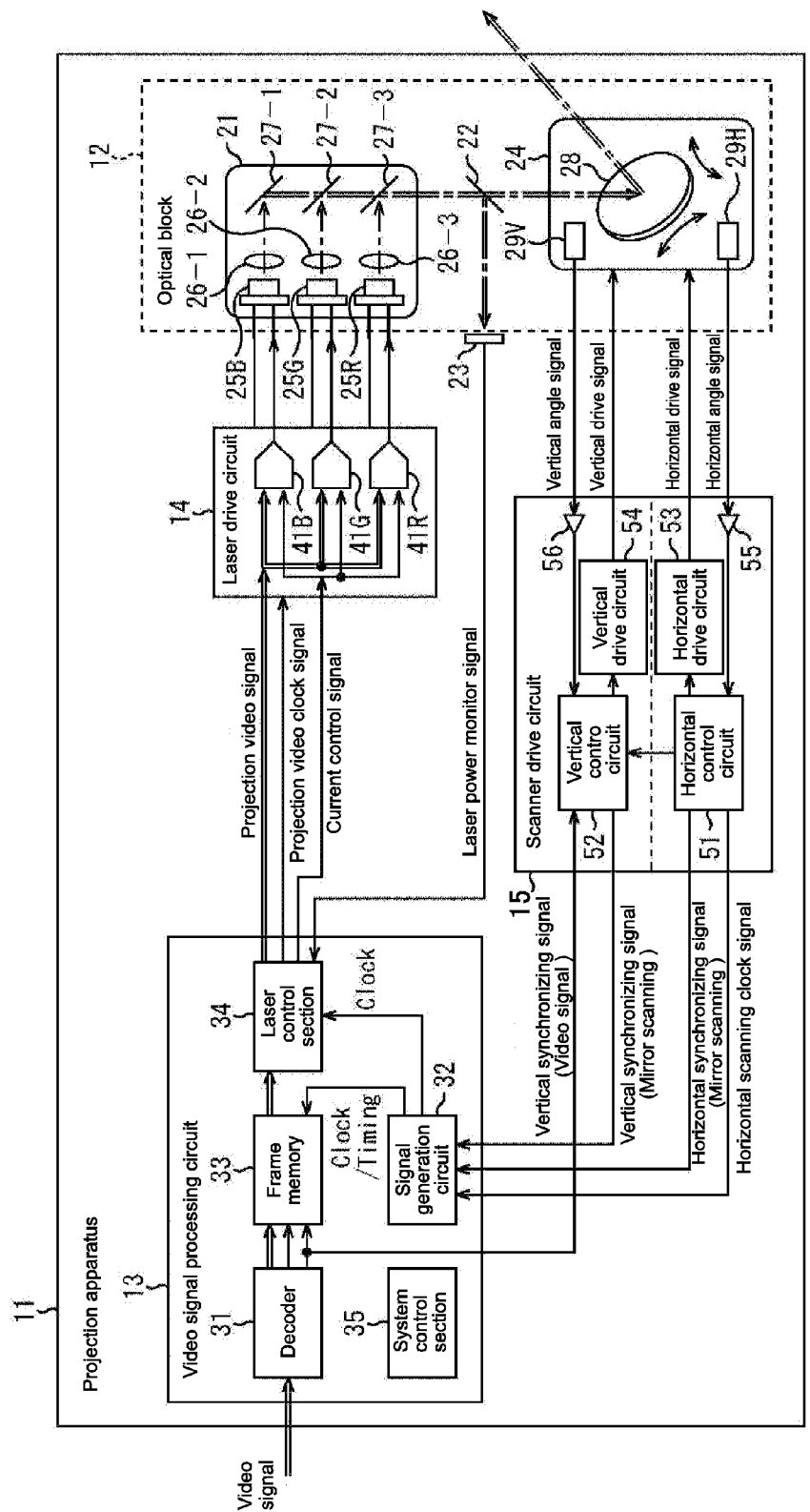
FIG. 4 is a block diagram showing an exemplary configuration of a projection apparatus in an embodiment with the application of the present technology.

FIG. 4 is a block diagram showing an exemplary configuration of a projection apparatus in an embodiment with the application of the present technology.

In FIG. 4, a projection apparatus 11 is configured to include an optical block 12, a video signal processing circuit 13, a laser drive circuit 14, and a scanner drive circuit 15. The projection apparatus 11 projects video onto a screen with the light source of laser light. The video to be projected is the one corresponding to video signals coming from external apparatuses including a reproduction apparatus and an imaging apparatus, for example.

The optical block 12 is configured to include a light source unit 21, a beam splitter 22, a light-receiving element 23, and a horizontal/vertical scanner unit 24.

The light source unit 21 is a combination of laser light sources 25R, 25G, and 25B, collimator lenses 26-1 to 26-3, and beam splitters 27-1 to 27-3.

The laser light sources 25R, 25G, and 25B respectively output laser light of corresponding three colors (wavelength) in response to a current coming from the laser drive circuit 14. As an example, the laser light source 25R outputs red laser light at a level corresponding to a red pixel value in video to be projected by the projection apparatus 11. Similarly, the laser light source 25G outputs green laser light at a level corresponding to a green pixel value in the video to be projected by the projection apparatus 11. The laser light source 25B outputs blue laser light at a level corresponding to a blue pixel value in the video to be projected by the projection apparatus 11. Herein, the laser light sources 25R, 25G, and 25B are each desirably a small-sized highly-efficient semiconductor laser.

The collimator lenses 26-1 to 26-3 respectively collimate the laser light coming from the laser light sources 25R, 25G, and 25B, and produce approximately collimated light.

The beam splitters 27-1 to 27-3 put together the laser light coming from the laser light sources 25R, 25G, and 25B, and produce a beam.

That is, the beam splitter 27-1 reflects the blue laser light coming from the laser light source 25B toward the horizontal/vertical scanner unit 24. The beam splitter 27-2 reflects the green laser light coming from the laser light source 25G toward the horizontal/vertical scanner unit 24, and passes therethrough the blue laser light reflected by the beam splitter 27-1. The beam splitter 27-3 reflects the red laser light coming from the laser light source 25R toward the horizontal/vertical scanner unit 24, and passes therethrough the blue and green laser light respectively reflected by the beam splitters 27-1 and 27-2. These beam splitters 27-1 to 27-3 are so combined and disposed that the laser light from the laser light sources 25R, 25G, and 25B share the same optical axis.

The beam splitter 22 is disposed on the optical axis of the laser light directed from the light source unit 21 to the horizontal/vertical scanner unit 24. The beam splitter 22 partially reflects the laser light coming from the laser light sources 25R, 25G, and 25B toward the light-receiving element 23. The laser light passed through the beam splitter 22 enters the horizontal/vertical scanner unit 24.

The light-receiving element 23 receives the laser light reflected by the beam splitter 22, and converts the laser light into an electric signal at a level corresponding to the amount thereof. The light-receiving element 23 then provides the electric signal to the video signal processing circuit 13 as a laser power monitor signal corresponding to the emission power of the laser light.

The horizontal/vertical scanner unit 24 includes at least a scanning mirror 28, and angle sensors 29V and 29H.

The scanning mirror 28 is a very-small movable mirror formed by MEMS (Micro Electro Mechanical Systems), and is driven vertically and horizontally in a predetermined angular range in response to signals coming from the scanner drive circuit 15, i.e., a vertical drive signal and a horizontal drive signal. That is, the scanning mirror 28 reflects the laser light coming from the laser light sources 25R, 25G, and 25B to modulate the radiation angle thereof, thereby directing the laser light for vertical and horizontal scanning of the video to be projected by the projection apparatus 11.

The angle sensor 29V detects the vertical angle of the scanning mirror 28 to output a vertical angle signal indicating the radiation angle of the laser light for vertical scanning of the video. The angle sensor 29H detects the horizontal angle of the scanning mirror 28 to output a horizontal angle signal indicating the radiation angle of the laser light for horizontal scanning of the video.

In the projection apparatus 11 of FIG. 4, the horizontal/vertical scanner unit 24 includes a piece of scanning mirror 28 (two-axis scanner), which is driven in both the vertical and horizontal directions. Alternatively, the projection apparatus 11 may be so configured that the horizontal/vertical scanner includes two pieces of scanning mirror (one-axis scanner), e.g., a scanning mirror to be driven in the vertical direction, and a scanning mirror to be driven in the horizontal direction. Moreover, as an alternative to the configuration of the horizontal/vertical scanner unit 24 internally including the angle sensors 29V and 29H, a sensor may be externally provided for detecting the angle of the scanning mirror 28.

The video signal processing circuit 13 is configured to include a decoder 31, a signal generation circuit 32, a frame memory 33, a laser control section 34, and a system control section 35. The video signal processing circuit 13 processes a video signal coming from the outside, thereby generating a projection video signal in synchronization with the scanning movement of the laser light, and in accordance with the laser properties such as wavelength. This projection video signal is for projecting video on the screen.

The decoder 31 decodes the video signal for supply to the frame memory 33. When the video signal is a luminance/chrominance signal (YCC), for example, the decoder 31 performs color gamut conversion on the video signal to make it match the respective wavelengths of the laser light sources 25R, 25G, and 25B in the optical block 12, i.e., to have an RGB video signal. The decoder 31 also extracts a vertical synchronizing signal from the video signal for supply to the frame memory 33 and the scanner drive circuit 15.

The signal generation circuit 32 generates a projection video clock signal in synchronization with a horizontal scanning clock coming from the scanner drive circuit 15. This projection video clock signal indicates the timing when to output the projection video signal, and is supplied to the frame memory 33 and the laser control section 34. At this time, based on the timing of the vertical and horizontal synchronizing signals provided by the scanner drive circuit 15, the signal generation circuit 32 calculates the scanning position on the screen at the clock for pixel projection. The signal generation circuit 32 then generates the projection video clock signal to allow reading of the video signal corresponding to the scanning position. The signal generation circuit 32 also generates a read timing signal for supply to the frame memory 33. This read timing signal indicates the timing when to start reading of the video signal.

The frame memory 33 temporarily stores the video signal coming from the decoder 31. The frame memory 33 supplies a pixel signal to the laser control section 34 in response to the timing of the projection video clock signal coming from the signal generation circuit 32. This pixel signal indicates the value of each pixel in the video corresponding to the video signal in storage. The frame memory 33 also adjusts the timing to read the video signal in response to the read timing signal coming from the signal generation circuit 32.

The laser control section 34 is driven in accordance with the timing of the projection video clock signal coming from the signal generation circuit 32. The laser control section 34 generates the projection video signal from the video signal read from the frame memory 33. This projection video signal is generated based on the properties of light coming from the laser light sources 25R, 25G, and 25B, the laser power monitor signal coming from the light-receiving element 23, and others. With this projection video signal, the laser light coming from the laser light sources 25R, 25G, and 25B radiates with the emission power appropriate to the video signal. The laser control section 34 supplies the generated projection video signal to the laser drive circuit 14 together with the projection video clock signal, and a current control signal. This current control signal is for controlling a current, which is used by the laser light sources 25R, 25G, and 25B to output the laser light.

The system control section 35 includes a CPU (Central Processing Unit). This system control section 35 controls the blocks in the video signal processing circuit 13 in response to a control signal coming from a host controller (not shown), for example.

The laser drive circuit 14 drives the laser light sources 25R, 25G, and 25B in response to the projection video signal, which matches the respective wavelengths of the laser light sources 25R, 25G, and 25B in the optical block 12.

That is, the laser drive circuit 14 includes current supply sections 41R, 41G, and 41B. The current supply section 41R modulates the current in accordance with the projection video signal matching the wavelength of red light, and supplies the modulated current to the laser light source 25R at the timing based on the projection video clock signal. Similarly, the current supply section 41G modulates the current in accordance with the projection video signal matching the wavelength of green light, and supplies the modulated current to the laser light source 25G at the timing based on the projection video clock signal. The current supply section 41B modulates the current in accordance with the projection video signal matching the wavelength of blue light, and supplies the modulated current to the laser light source 25B at the timing based on the projection video clock signal. The current supply sections 41R, 41G, and 41B control the full-scale current in response to the current control signal coming from the laser control section 34.

The scanner drive circuit 15 includes a horizontal control circuit 51, a vertical control circuit 51, a horizontal drive circuit 53, a vertical drive circuit 54, and amplifiers 55 and 56.

The horizontal control circuit 51 uses the mechanical resonance frequency of the scanning mirror 28 as a basis to generate a horizontal scanning clock signal, and a horizontal synchronizing signal. The horizontal scanning clock signal is synchronous with horizontal scanning using the scanning mirror 28, and the horizontal synchronizing signal indicates the position where to start horizontal scanning using the scanning mirror 28. The horizontal control circuit 51 also refers to the horizontal angle signal coming from the angle sensor 29H via the amplifier 55 to adjust the horizontal synchronizing signal and the horizontal scanning clock signal to make the scanning mirror 28 keep resonating at any appropriate amplitude, thereby controlling the horizontal movement of the scanning mirror 28. The horizontal control circuit 51 then supplies the horizontal synchronizing signal and the horizontal scanning clock signal to the signal generation circuit 32, and supplies the horizontal synchronizing signal to the vertical control circuit 52 and the horizontal drive circuit 53.

The vertical control circuit 52 uses, as a basis, the vertical synchronizing signal being synchronous with the video signal coming from the decoder 31, and the horizontal synchronizing signal coming from the horizontal control circuit 51 to generate another vertical synchronizing signal. This vertical synchronizing signal indicates the position where to start vertical scanning using the scanning mirror 28, that is, is synchronous with scanning using the scanning mirror 28. The vertical control circuit 52 then supplies the vertical synchronizing signal being synchronous with scanning using the scanning mirror 28 to both the signal generation circuit 32 and the vertical drive circuit 54.

The horizontal drive circuit 53 generates a sinusoidal horizontal drive signal at the timing of the horizontal synchronizing signal coming from the horizontal control circuit 51. This horizontal drive signal is for driving the scanning mirror 28 in the horizontal direction, and is supplied to the scanning mirror 28.

The vertical drive circuit 54 refers to the vertical synchronizing signal coming from the vertical control circuit 52 and being synchronous with scanning using the scanning mirror 28 to generate a vertical drive signal. This vertical synchronizing signal is for driving the scanning mirror 28 in the vertical direction, and is supplied to the scanning mirror 28. Herein, the waveform of the vertical drive signal for use in the projection apparatus 11 will be described later by referring to FIGS. 5A to 5C.

In the configuration of the projection apparatus 11 as above, the laser light sources 25R, 25G, and 25B can be driven by the projection video signal appropriate to the scanning position with the scanning mirror 28.

In the projection apparatus 11, with the aim to reduce the effect caused by the frequency during the return movement getting close to the mechanical resonance frequency of the scanning mirror 28 as described above, the waveform of the vertical drive signal in use shows a linear motion. This linear motion is at approximately the same speed in two directions in a display interval in which the laser light is directed vertically from top to bottom, and in a display interval in which the laser light is directed vertically from bottom to top.

Figure 5A:
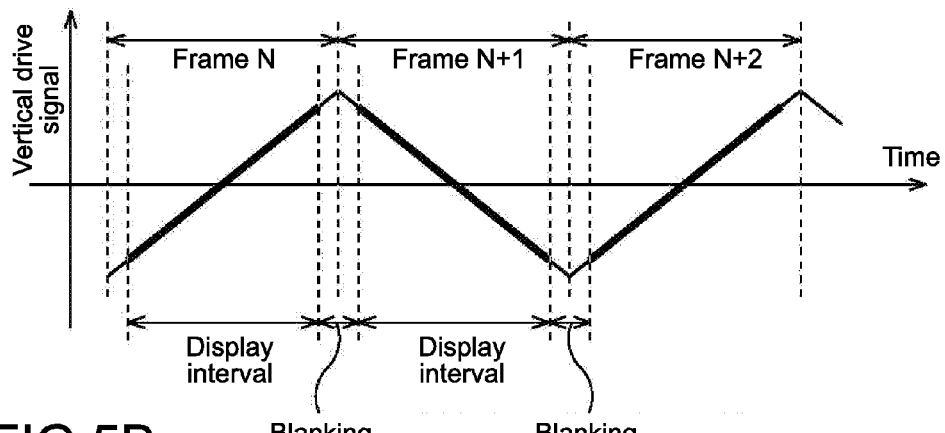
FIGS. 5A to 5C are each a diagram showing an exemplary waveform of the vertical drive signal.
Figure 5B:
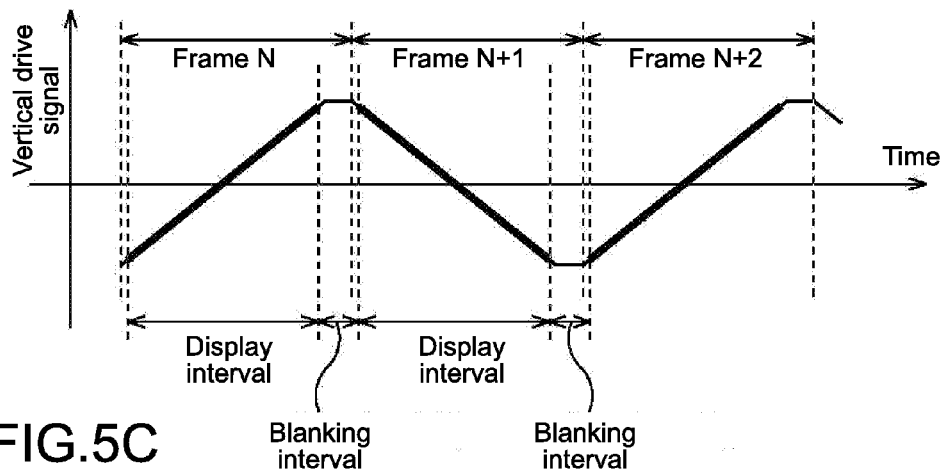
Figure 5C:
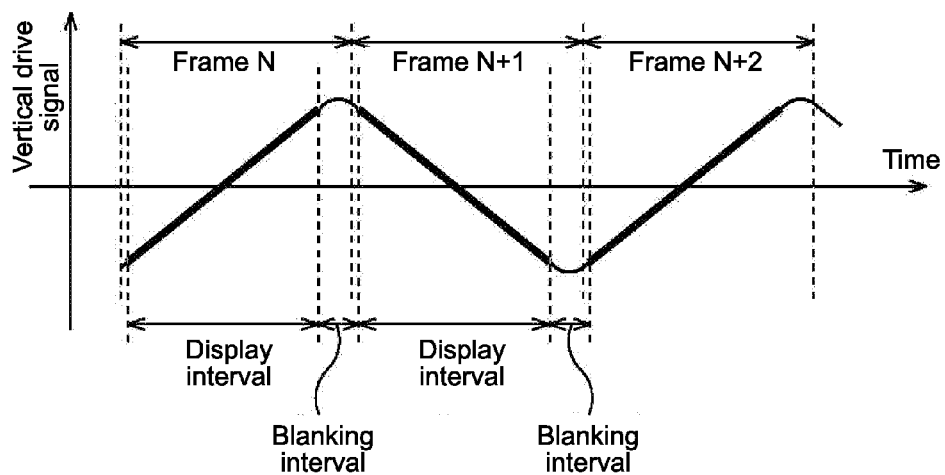

FIGS. 5A to 5C each show an exemplary waveform of the vertical drive signal for use in the projection apparatus 11.

As shown in FIGS. 5A to 5C, the vertical drive signal includes alternately a display interval in which the laser light is directed from bottom to top, and a display interval in which the laser light is directed from top to bottom. These display intervals include therebetween a blanking interval in which the laser light is not emitted. That is, with processing, these display intervals in which the laser light is directed from bottom to top and from top to bottom alternately display video per frame, i.e., output video per predetermined amount. The waveform of the vertical drive signal shows a linear motion at approximately the same speed in two directions in these display intervals in which the laser light is directed from bottom to top and from top to bottom, i.e., shows approximately the same absolute value of the slope in these display intervals.

As shown in FIG. 5A, the waveform of the vertical drive signal may be triangular, i.e., in a blanking interval, the slope in one display interval shows a direct change to the slope in the next display interval like forming a vertex.

Alternatively, as shown in FIG. 5B, the waveform of the vertical drive signal may be trapezoidal including a flat portion between display intervals, i.e., the slope in one display interval becomes flat in a blanking interval, and then shows a change to the slope in the next display interval. By the vertical drive signal with such a trapezoidal waveform, the vertical drive circuit 54 may control vertical scanning with the scanning mirror 28 so that the display intervals include therebetween the blanking interval in which the scanning mirror 28 stops moving in the vertical direction.

Still alternatively, as shown in FIG. 5C, the waveform of the vertical drive signal may have a curved vertex portion, i.e., the slope in one display interval forms a smooth curve in a blanking interval before showing a change to the slope in the next display interval. That is, by the vertical drive signal with such a triangular waveform, forming an obtuse vertex may reduce any component equivalent to the mechanical resonance frequency of the scanning mirror 28, thereby being able to reduce the static time of the scanning mirror 28 during the return movement of the laser light.

In order to use the vertical drive signal with such a waveform, drive waveform data of two frames may be stored separately for the display intervals in which the laser light is directed vertically from top to bottom and from bottom to top, and every time when the laser light turns back, reading of the appropriate drive waveform data may be alternately performed.

In the projection apparatus 11, for example, the drive waveform data for use to generate such a vertical drive signal is made ready in advance for storage in the vertical control circuit 52, and the vertical control circuit 52 refers to the drive waveform data to generate the vertical drive signal.

Figure 6:
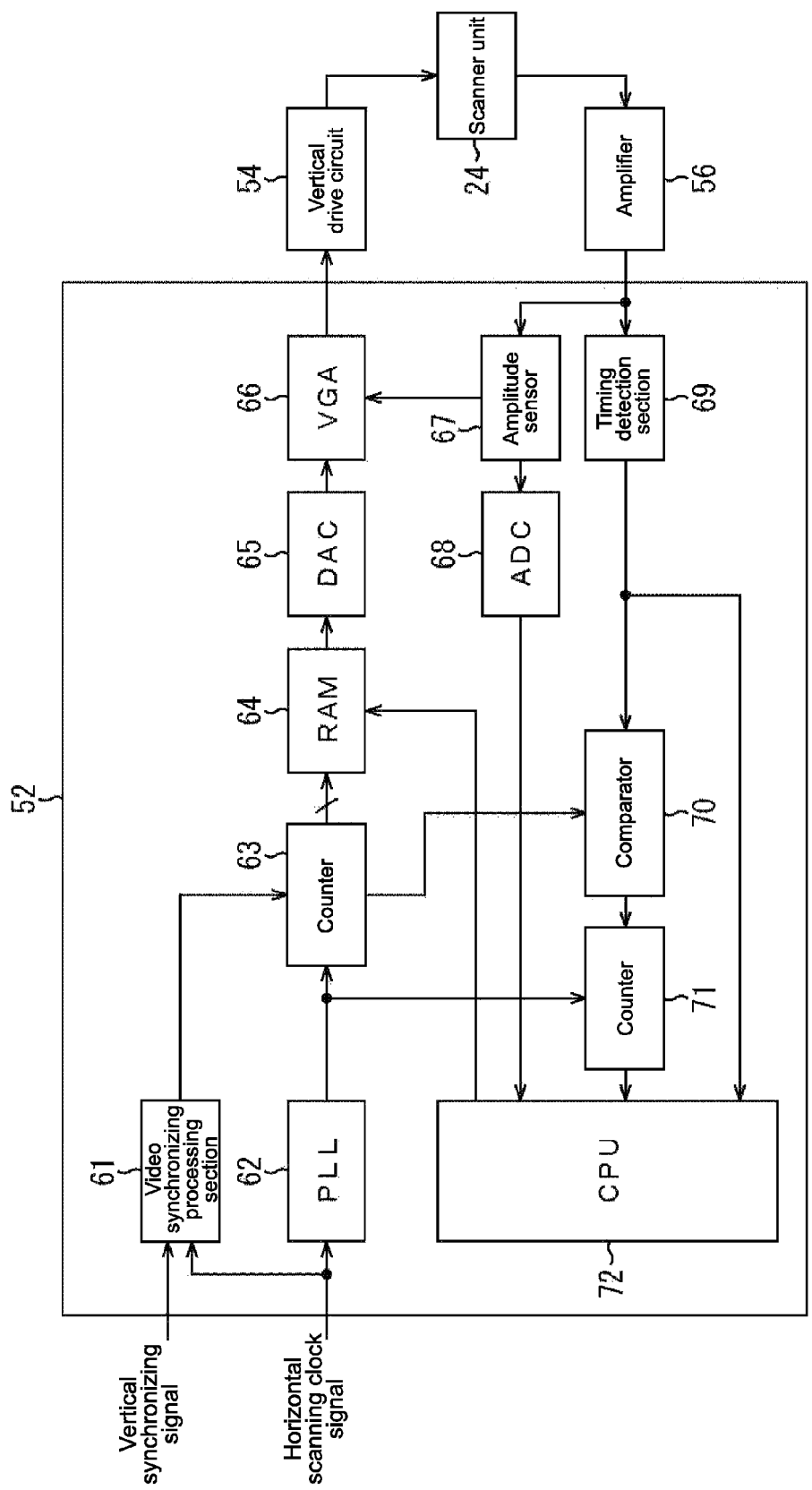
FIG. 6 is a block diagram showing a first exemplary configuration of a vertical control circuit.

Next, FIG. 6 is a block diagram showing a first exemplary configuration of the vertical control circuit 52.

As shown in FIG. 6, the vertical control circuit 52 is configured to include a video synchronizing processing section 61, a PLL (Phase Locked Loop) 62, a counter 63, a RAM (Random Access Memory) 64, a DAC (Digital to Analog Converter) 65, a VGA (Variable Gain Amplifier) 66, an amplitude sensor 67, an ADC (Analog-to-Digital Converter) 68, a timing detection section 69, a comparator 70, a counter 71, and a CPU 72.

The video synchronizing processing section 61 is provided with, by the decoder 31 of FIG. 4, a vertical synchronizing signal being synchronous with the video signal, and by the horizontal control circuit 51, the video synchronizing processing section 61 is provided with a horizontal scanning clock signal being synchronous with horizontal scanning using the scanning mirror 28. The video synchronizing processing section 61 then supplies a reset signal to the counter 63 at the timing of the vertical synchronizing signal being synchronous with the video signal. This reset signal resets the count of the counter 63.

The PLL 62 generates a read frequency Fdv for supply to both the counters 63 and 71. This read frequency Fdv is the result of multiplying the horizontal scanning frequency Fh by A. The horizontal scanning frequency Fh is based on the horizontal scanning clock signal, which is provided by the horizontal control circuit 51, and is in synchronization with horizontal scanning using the scanning mirror 28.

The counter 63 counts the cycle of the read frequency Fdv provided by the PLL 62. The counter 63 resets the count value N when the value becomes larger than the value being the result of dividing a frame cycle by the read frequency Fdv (1 frame/Fdv), and then starts counting for the next frame. The counter 63 provides a timing signal to the comparator 70 at the timing when the count value N reaches the value corresponding to the center of the frame.

The RAM 64 stores the drive waveform data in the form of data table, and the value of the drive waveform data is sequentially read to the DAC 65 in accordance with a clock being synchronous with the read frequency Fdv provided via the counter 63. In response to a waveform control signal coming from the CPU 72, as will be described later by referring to FIGS. 10A and 10B, the RAM 64 also advances the timing to read the drive waveform data based on an amount of delay.

The DAC 65 performs D/A (Digital/Analog) conversion on the drive waveform data read from the RAM 64 in accordance with the read frequency Fdv, which is the result of multiplying the horizontal scanning frequency Fh by A. The generated analog vertical drive signal is provided to the VGA 66.

The VGA 66 amplifies and outputs the vertical drive signal coming from the DAC 65 by the gain of a gain control signal from the amplitude sensor 67. In response to this vertical drive signal from the VGA 66, the scanning mirror 28 (FIG. 4) in the horizontal/vertical scanner unit 24 is driven via the vertical drive circuit 54. The vertical angle signal coming from the angle sensor 29V in the horizontal/vertical scanner unit 24 is amplified by the low-noise amplifier 56 for output to both the amplitude sensor 67 and the timing detection section 69.

The amplitude sensor 67 detects the vertical amplitude of the scanning mirror 28 by holding the peak and bottom of the vertical angle signal coming from the amplifier 56, and by finding a difference therebetween. The amplitude sensor 67 then supplies the gain control signal to the VGA 66 to perform feedback control over the output of the VGA 66. This gain control signal is for controlling the gain of the VGA 66 to make the vertical amplitude of the scanning mirror 28 remain within a predetermined range. The amplitude sensor 67 also supplies a signal indicating the vertical amplitude of the scanning mirror 28 to the ADC 68.

The ADC 68 performs A/D (Analog/Digital) conversion on the signal coming from the amplitude sensor 67 for supply to the CPU 72. This signal indicates the vertical amplitude of the scanning mirror 28.

The timing detection section 69 detects the timing when the vertical angle of the scanning mirror 28 becomes zero in response to the vertical angle signal coming from the amplifier 56, for example, thereby outputting a timing signal indicating the vertical position of the scanning mirror 28.

The comparator 70 makes a comparison between the two timing signals, i.e., the timing signal coming from the counter 63, and the timing signal coming from the timing detection section 69. The timing signal provided by the counter 63 indicates the timing being synchronous with the center value of the frame cycle for reading the drive waveform data from the RAM 64. The timing signal provided by the timing detection section 69 indicates the timing when the vertical angle of the scanning mirror 28 becomes zero. As such, by the comparison between these timing signals, the comparator 70 supplies the pulse appropriate to the timing difference to the counter 71.

The counter 71 counts the pulses coming from the comparator 70 to measure an amount of delay caused when the signals pass through the amplifier 56 and the comparator 70. The counter 71 then provides a count value indicating the amount of delay to the CPU 72.

In accordance with the amount of delay measured by the counter 71, the CPU 72 performs processing for delay compensation. That is, the CPU 72 provides the waveform control signal to the RAM 64 to control the drive waveform data to be read therefrom earlier by the amount of delay measured by the counter 71.

The vertical control circuit 52 is configured as above, and the drive waveform data is generated in accordance with the read frequency Fdv, which is the result of multiplying the horizontal scanning frequency Fh by A. This horizontal scanning frequency Fh is the one based on the horizontal scanning clock signal being synchronous with horizontal scanning using the scanning mirror 28. When processing is performed in synchronization with the vertical synchronizing signal in the incoming video signal, the frame time is fixed based on the incoming video signal. Therefore, the scanning frequency for vertical scanning using the scanning mirror 28 is expected to be adjusted to be the frame frequency (60 Hz) of the video signal by increasing or decreasing the number of lines in the vertical direction. Alternatively, to adjust the scanning frequency for vertical scanning using the scanning mirror 28 to be the frame frequency (60 Hz) of the video signal, the number of lines for rendering may be fixed, and the blanking time may be adjusted, for example.

With the vertical control circuit 52, multiplying the horizontal scanning frequency Fh by A increases the drive waveform data, which is the result of D/A conversion by the DAC 65. Therefore, the vertical drive signal may be generated with a high precision. This accordingly allows precise control over the position where to start rendering and where the laser light turns back, and over the horizontal position (phase) of the scanning mirror 28.

Moreover, with the vertical control circuit 52, feedback control may be performed on the vertical drive signal being the D/A conversion result of the drive waveform data read from the RAM 64. This feedback control is performed using the horizontal angle signal provided by the horizontal/vertical scanner unit 24. This allows provision of the vertical drive signal to the horizontal/vertical scanner unit 24 after making an adjustment thereon in the VGA 66 to realize the appropriate amplitude.

When the processing is performed in synchronization with the video signal, the frames may have a periodically-varying synchronization error in terms of the number of horizontal scanning lines. This is because the frame frequency of the video signal is not exactly divided by the horizontal scanning frequency Fh into an integer. Accordingly, for performing the processing in synchronization with the video signal, in the drive waveform data for use to generate the vertical drive signal, data in which the slope is directed from top to bottom may be prepared separately from data in which the slope is directed from bottom to top.

To be specific, when the frame frequency of the video signal is 60 Hz, and when the horizontal scanning frequency Fh is 20 kHz, the number of cycles per frame is 333.333. Considering that the video output is made in two directions, the number of horizontal scanning lines is 666 in a certain frame, is 666 lines in the next frame, and is 668 lines in the next frame, and this is repeated.

Such a synchronization error with which the number of horizontal scanning lines varies by frame may appear as a displacement of the vertical position when the waveform of the vertical drive signal in use is triangular as shown in FIG. 5A.

Figure 7A:
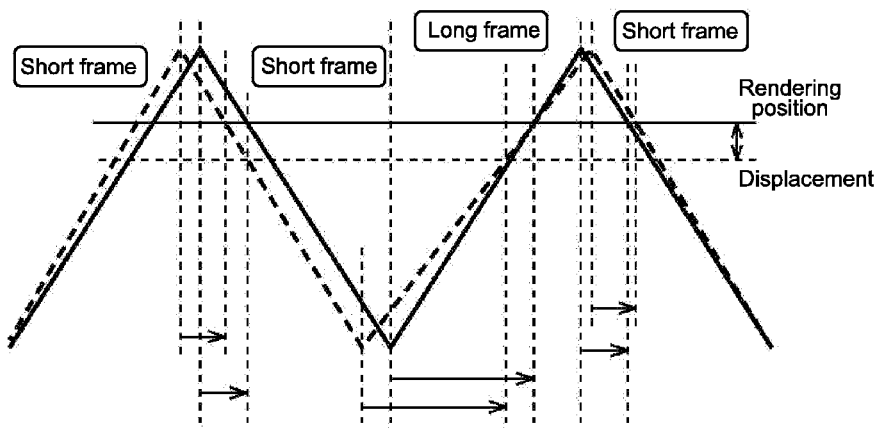
FIGS. 7A and 7B are each a diagram illustrating a synchronization error.
Figure 7B:
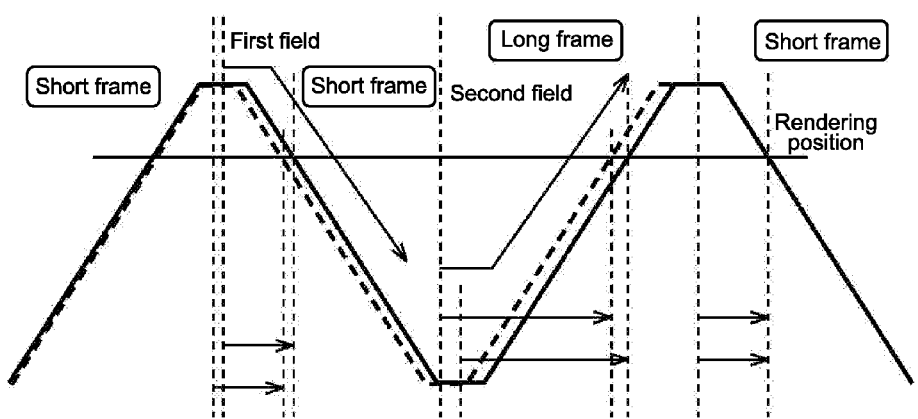

As shown in FIG. 7A, for example, between a short frame with the 666 horizontal scanning lines and a long frame with the 668 horizontal scanning lines, a displacement is caused at the position for vertical rendering. In FIGS. 7A and 7B, the solid line indicates an ideal vertical drive signal, and the broken line indicates a vertical drive signal with a lag in the frame time.

For preventing the displacement of the position for vertical rendering, as shown in FIG. 7B, any synchronization error may be adjusted by using the vertical drive signal (FIG. 5B) with the trapezoidal waveform including a flat portion where the laser light turns back, and by increasing or decreasing the flat portion in the trapezoidal waveform of the vertical drive signal.

Figure 8A:
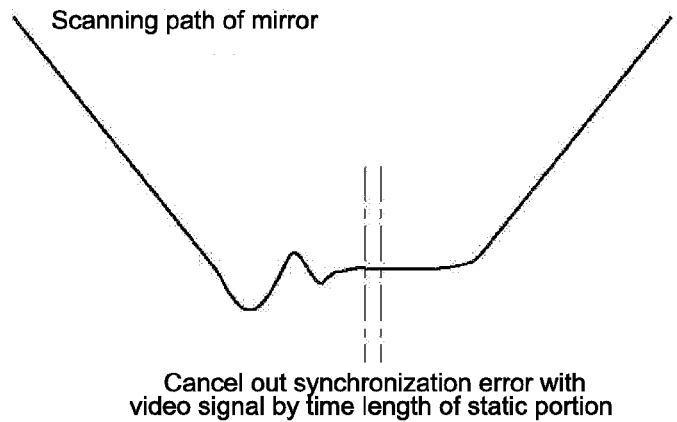
FIGS. 8A and 8B are each a diagram illustrating a synchronization error.
Figure 8B:
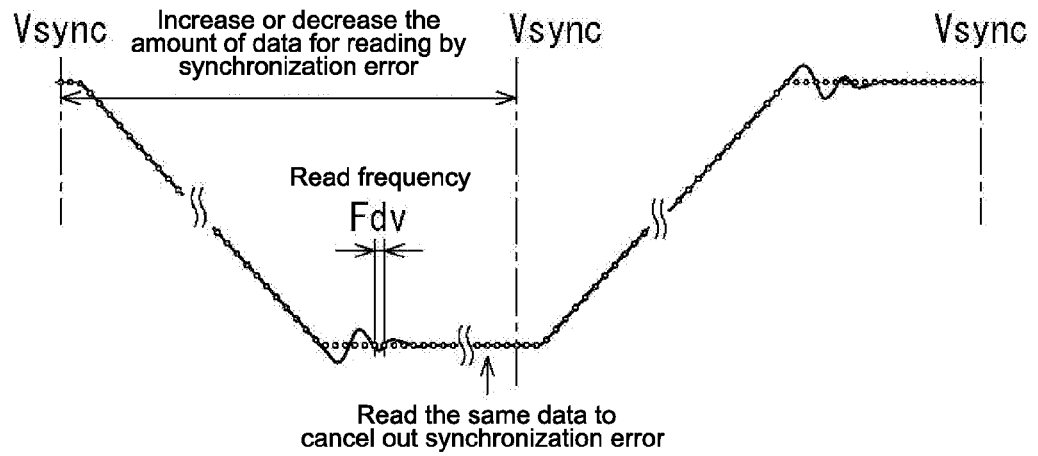

That is, as shown in FIGS. 8A and 8B, at the flat portion in the trapezoidal waveform of the vertical drive signal, i.e., at the static portion where the laser light turns back, ideally, the scanning mirror 28 is not in motion (actually the displacement rate is low). This static portion shows a low displacement rate of the scanning mirror 28 irrespective of the amount of the drive waveform data for reading. Therefore, the synchronization error may be cancelled out by reading the same data at the static portion, thereby being able to prevent a displacement of the position for vertical rendering.

As an example, the synchronization error is equivalent to a cycle of horizontal scanning, and thus a displacement of the position for vertical rendering is equivalent to two lines. With the displacement rate of the scanning mirror 28 reduced down to 1/20 at the flat portion in the trapezoidal waveform of the vertical drive signal, the displacement of the position for vertical rendering may be reduced to 0.1 line or less.

Described next is the vertical drive signal for reducing the static time by referring to FIGS. 9A to 9C.

Figure 9A:
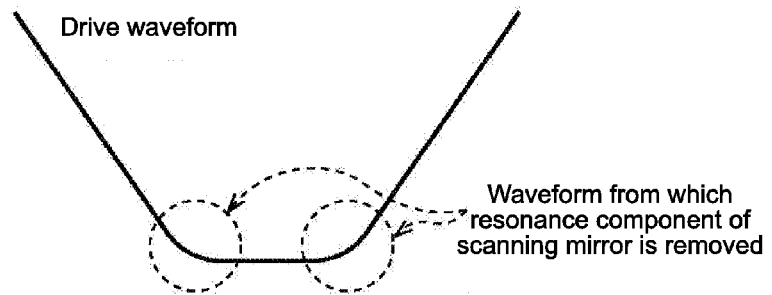
FIGS. 9A to 9C are each a diagram showing a vertical drive signal for reducing a static time.
Figure 9B:
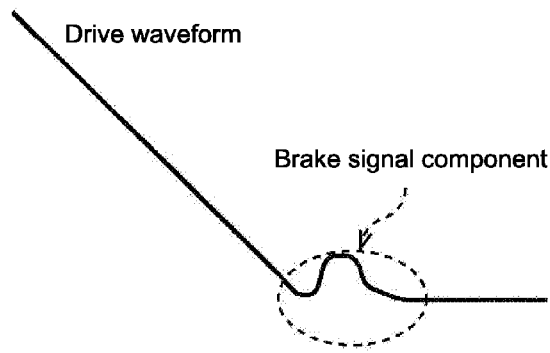
Figure 9C:
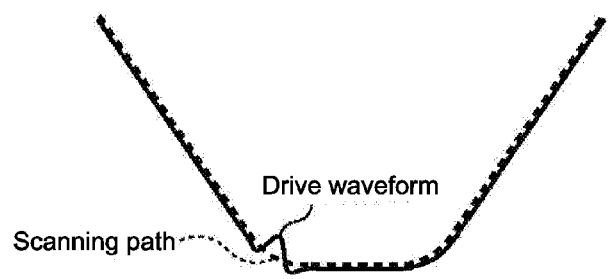

FIGS. 9A to 9C each show the lower flat portion in the trapezoidal waveform of the vertical drive signal. Note that the same is applicable also to the upper flat portion in the trapezoidal waveform thereof.

As shown in FIG. 9A, in the trapezoidal waveform of the vertical drive signal, any resonance component of the scanning mirror 28 may be removed from the portion where the slope shows a change, i.e., in the vicinity of ends of the flat portion, thereby being able to reduce the static time. Note that such a waveform may be generated by digital processing, or by analog processing (notch filter), for example.

As shown in FIG. 9B, at the portion where the trapezoidal waveform of the vertical drive signal becomes flat, the waveform may include a brake signal component for driving the scanning mirror 28 in the direction opposite to the moving direction thereof. With the scanning mirror 28 put in braking motion by such a vertical drive signal, the static time may be reduced.

That is, FIG. 9C shows the trapezoidal waveform of the vertical drive signal and the scanning path of the scanning mirror 28 overlaid one on the other. This shows that the waveform without the resonance component of the scanning mirror 28 but with the brake signal component prevents the scanning mirror 28 from vibrating before being static so that the static time is reduced.

By referring to FIGS. 10A to 11, described next is signal delay compensation in the vertical control circuit 52.

As described above by referring to FIG. 6, in the vertical control circuit 52, the vertical angle signal provided by the horizontal/vertical scanner unit 24 is used to detect the vertical amplitude of the scanning mirror 28 after being amplified by the low-noise amplifier 56, and to generate the timing signal indicating the vertical position of the scanning mirror 28, for example. When the vertical angle signal passes through the amplifier 56 and the comparator 70, a delay occurs. Because this vertical angle signal is used to determine the position where to start rendering for the video signal, a delay of the vertical angle signal causes a displacement of the scanning position, thereby affecting the image quality.

Figure 10A:
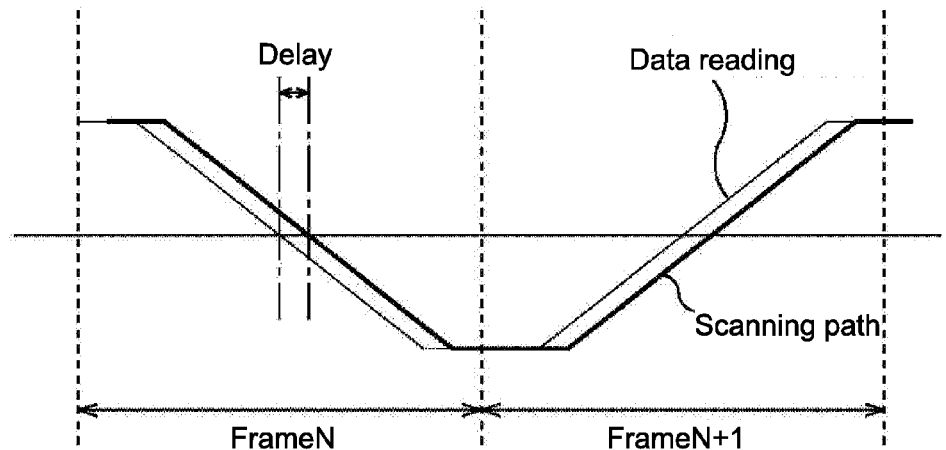
FIGS. 10A and 10B are each a diagram illustrating a signal delay.

As shown in FIG. 10A, for example, a delay occurs to the scanning path of the scanning mirror 28 with respect to the timing of reading the drive waveform data from the RAM 64.

Figure 10B:
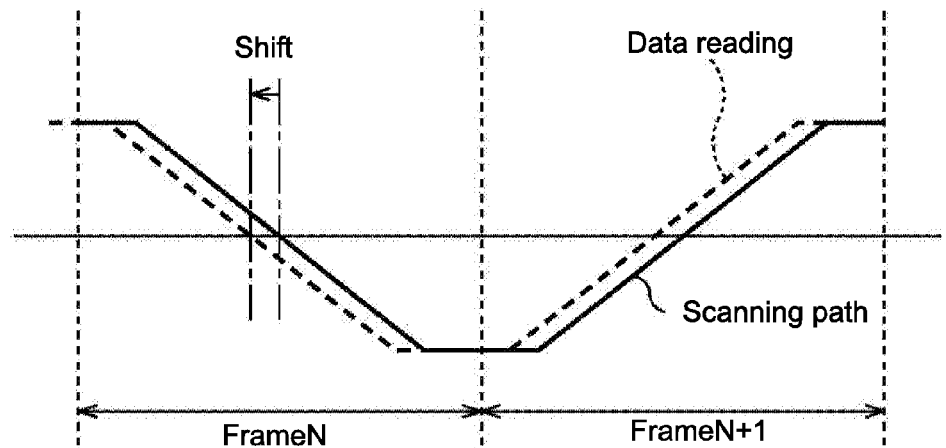

In consideration thereof, for correcting the displacement of the scanning position caused by the delay of the vertical angle signal, the vertical control circuit 52 measures the amount of delay using the combination of the comparator 70 and the counter 71. Thereafter, the CPU 72 provides the waveform control signal to the RAM 64 to advance the timing of reading the drive waveform data therefrom based on the amount of delay, i.e., to change the timing of reading the drive waveform data as shown in FIG. 10B.

This accordingly makes the scanning path of the scanning mirror 28 coincide with the original timing of reading the drive waveform data from the RAM 64 (FIG. 10A), thereby preventing a displacement of the scanning position caused by a delay of the vertical drive signal.

Moreover, at the time of generating the read frequency Fdv for reading the drive waveform data from the RAM 64, the delay-compensating minimum adjustment time is able to be changed by A, which is for multiplication of the horizontal scanning frequency Fh.

That is, for multiplying the horizontal scanning frequency Fh by 1 (A=1), delay compensation may be realized with precision of only two lines for horizontal rendering. On the other hand, by multiplying the horizontal scanning frequency Fh by 20 or more (A≥20), delay compensation may be realized with precision of 1/10 line or higher.

With such an adjustment, the position to start vertical rendering may be corrected, and the position to start horizontal rendering at this time corresponds to a value (A) set for multiplication of the horizontal scanning frequency Fh.

Figure 11:
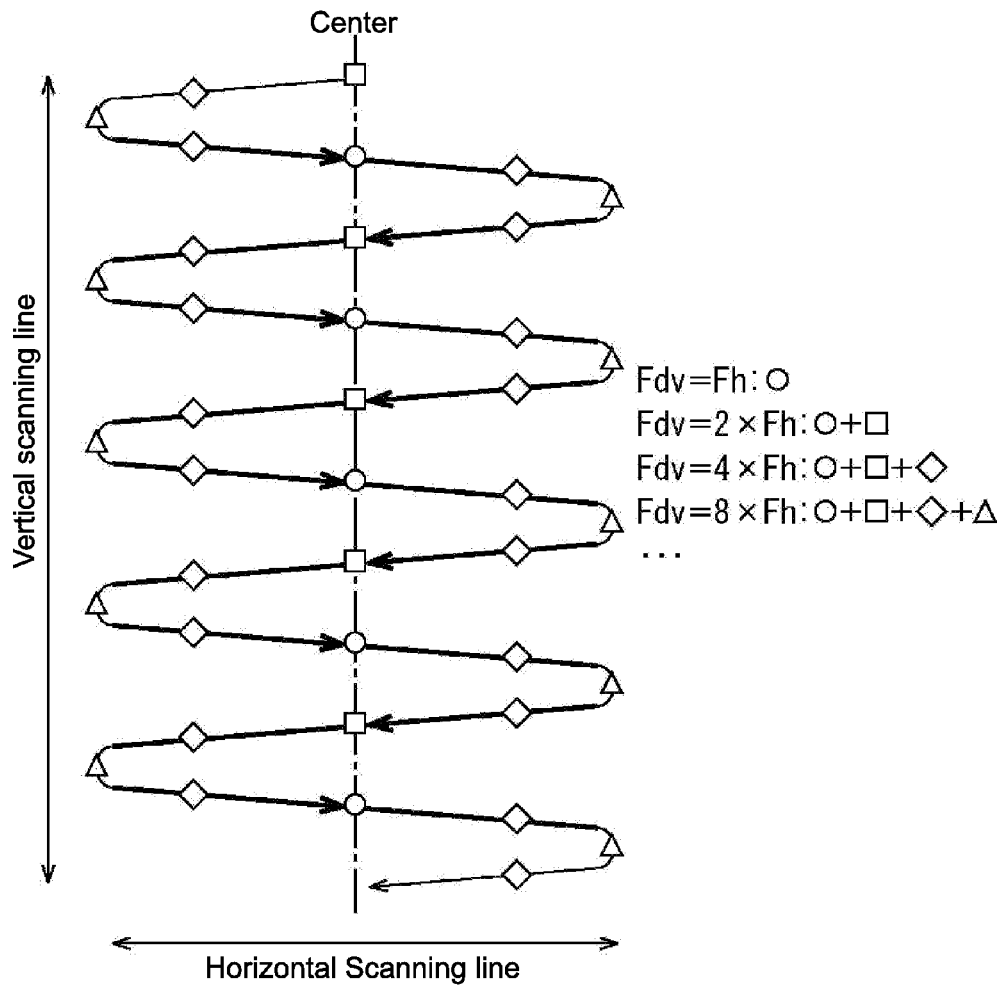
FIG. 11 is a diagram illustrating the relationship between compensating a signal delay and a position to start rendering in a horizontal direction.

As shown in FIG. 11, for example, for multiplying the horizontal scanning frequency Fh by 1 (A=1), the portions indicated by circles in FIG. 11 are the starting positions for horizontal rendering, and for multiplying the horizontal scanning frequency Fh by 2 (A=2), the portions indicated respectively by circles and squares in FIG. 11 are the starting positions for horizontal rendering. Similarly, for multiplying the horizontal scanning frequency Fh by 4 (A=4), the portions indicated respectively by circles, squares, and diamonds in FIG. 11 are the starting positions for horizontal rendering, and for multiplying the horizontal scanning frequency Fh by 8 (A=8), the portions indicated respectively by circles, squares, diamonds, and triangles in FIG. 11 are the starting positions for horizontal rendering.

As such, the vertical control circuit 52 is expected to adjust the timing of reading the drive waveform data from the RAM 64 in response to when the starting positions for vertical rendering are corrected.

Herein, the vertical control circuit 52 of FIG. 6 is so configured as to perform processing in synchronization with the vertical synchronizing signal in the video signal. Alternatively, the vertical control circuit 52 may not be synchronous with the vertical synchronizing signal in the video signal when performing the processing, for example.

Figure 12:
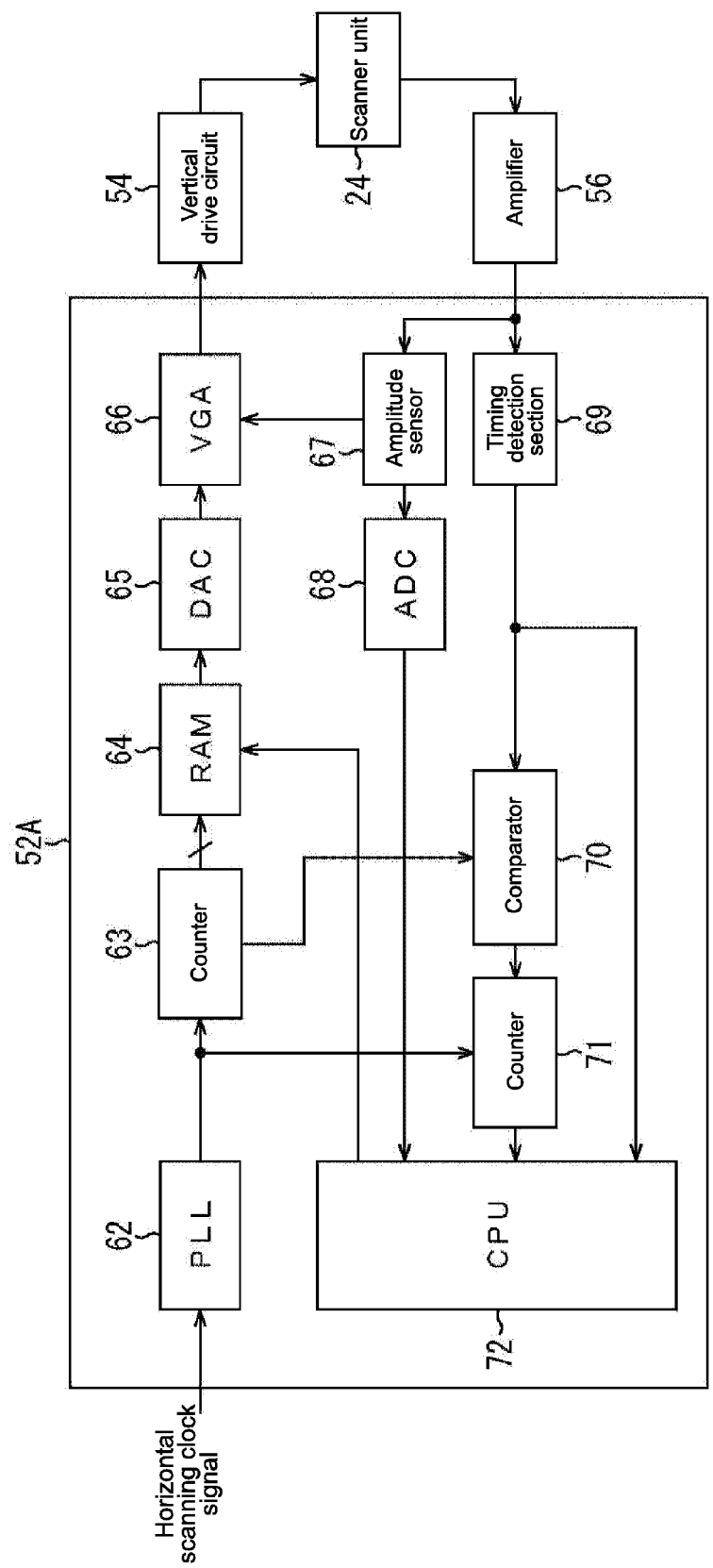
FIG. 12 is a block diagram showing a second exemplary configuration of the vertical control circuit.

That is, FIG. 12 shows a second exemplary configuration of the vertical control circuit 52.

As shown in FIG. 12, unlike the vertical control circuit 52 of FIG. 6, a vertical control circuit 52A does not include the video synchronizing processing section 61, but includes the PLL 62, the counter 63, the RAM 64, the DAC 65, the VGA 66, the amplitude sensor 67, the ADC 68, the timing detection section 69, the comparator 70, the counter 71, and the CPU 72.

Compared with the vertical control circuit 52 of FIG. 6, the vertical control circuit 52A has a difference of not establishing synchronization between the vertical synchronizing signal in the video signal and horizontal scanning using the scanning mirror 28. Also compared with the vertical control circuit 52 of FIG. 6, in the vertical control circuit 52A, the frame time is determined by a product of one half of the horizontal scanning frequency Fh and the number of lines in the vertical direction (½fh×the number of lines), and the number of lines in the vertical direction is determined by the sum of the vertical resolution of video for rendering and the blanking interval.

With the vertical control circuit 52A, in the drive waveform data for generating the vertical drive signal, data reading may be repeated for every two frames in the unit of data including data in which the slope is directed from top to bottom, and data in which the slope is directed from bottom to top.

In the vertical control circuits 52 and 52A, the amount of signal delay is measured by the combination of the comparator 70 and the counter 71. Alternatively, the amount of delay may be measured by the PLL, for example.

Figure 13:
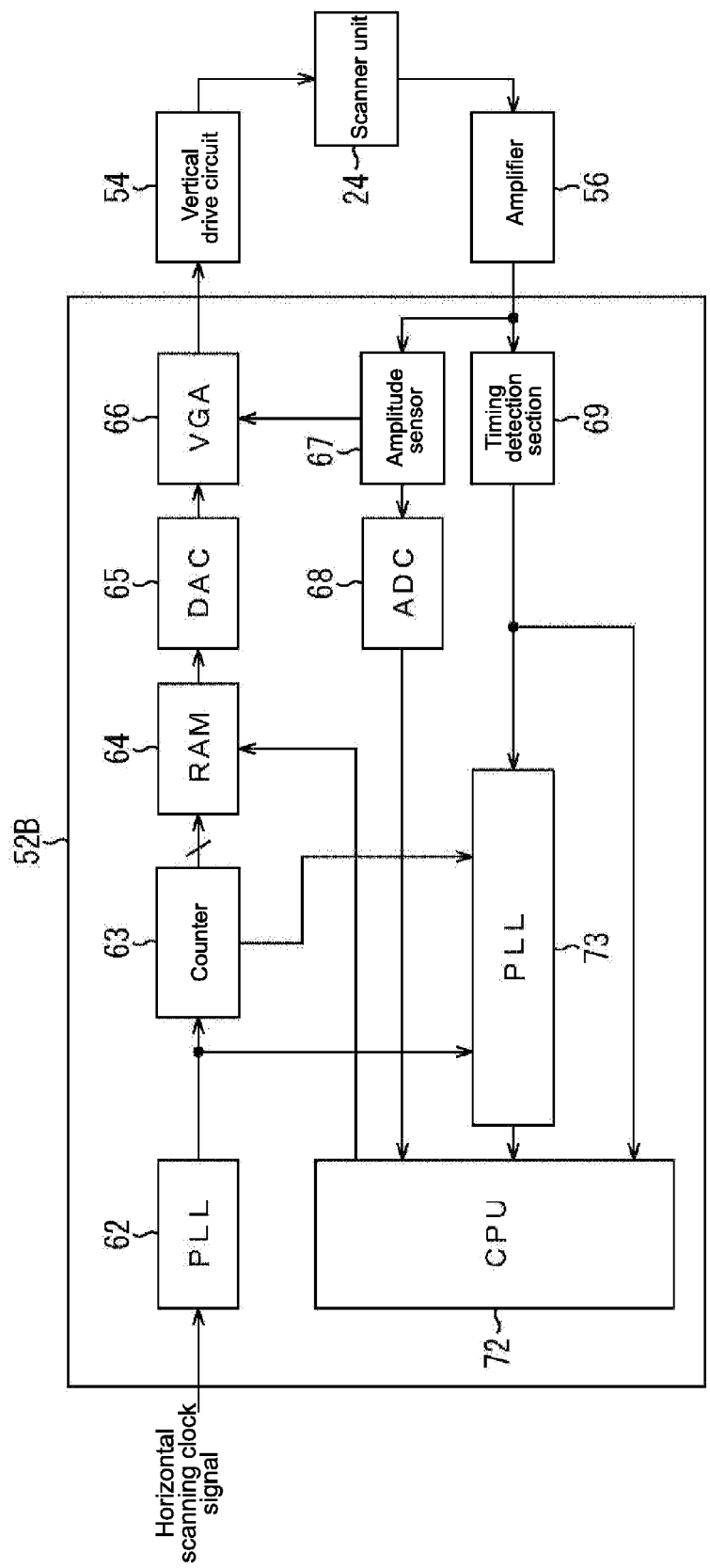
FIG. 13 is a block diagram showing a third exemplary configuration of the vertical control circuit.

That is, FIG. 13 shows a third exemplary configuration of the vertical control circuit 52.

As shown in FIG. 13, a vertical control circuit 52B is configured to include a PLL 73 as an alternative to the comparator 70 and the counter 71 in the vertical control circuit 52A of FIG. 12, and the remaining configuration is the same as that of the vertical control circuit 52A.

By the PLL 73 measuring the amount of signal delay, the resulting configuration may be simplified. Alternatively, instead of the comparator 70 and the counter 71, the vertical control circuit 52 of FIG. 6 may include the PLL 73.

Note that the waveform of the vertical drive signal for use in the projection apparatus 11 is not restricted to show a linear motion at approximately the same speed in two directions in a display interval in which the laser light is directed vertically from top to bottom, and in a display interval in which the laser light is directed vertically from bottom to top. That is, the waveform of a vertical drive signal for use may show a linear motion at different speeds between in the display interval in which the laser light is directed vertically from top to bottom, and in the display interval in which the laser light is directed vertically from bottom to top.

Figure 14:
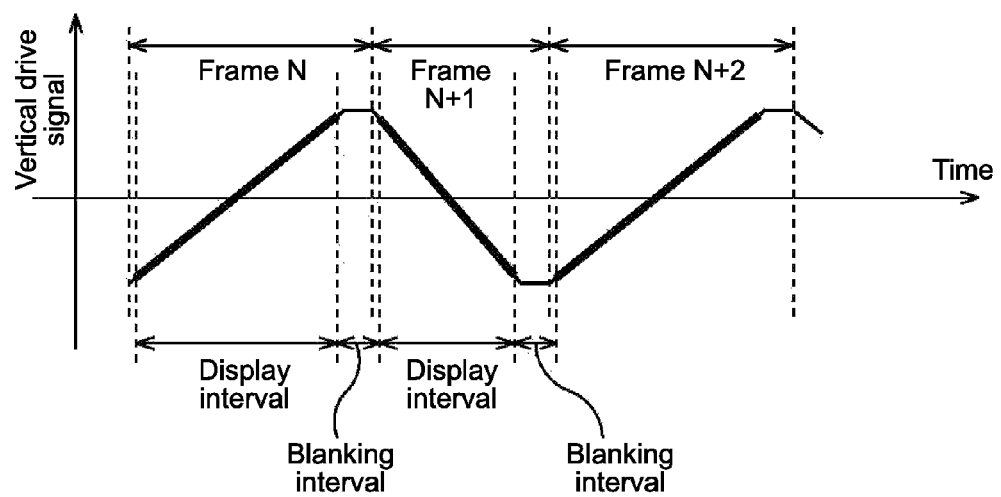
FIG. 14 is a diagram showing a modified example of a waveform of the vertical drive signal.

As shown in FIG. 14, for example, the waveform of the vertical drive signal for use may be trapezoidal, in which the slope in a display interval in which the laser light is directed vertically from bottom to top may be larger than the slope in a display interval in which the laser light is directed vertically from top to bottom. Also with such a vertical drive signal, as described by referring to FIGS. 8A and 8B, any displacement of positions for vertical rendering may be prevented by increasing or decreasing the amount of the drive waveform data for reading at the flat portion in the waveform of the vertical drive signal.

As described above, with the projection apparatus 11, a displacement occurring to the blanking interval is small when vertical scanning is performed using the scanning mirror 28, and a slew rate of the vertical drive signal is low. Therefore, compared with the previous apparatus, the static time may be reduced with more ease. This accordingly allows the projection apparatus 11 to improve the light-emission efficiency in a frame time, i.e., reduce the blanking interval and improve the relative ratio of the display interval. Therefore, even if the laser light sources 25 in use are in the same level of performance as those in the previous apparatus, video projection may be performed with better brightness, and with the improved vertical resolution.

Also with the projection apparatus 11, for video projection with the same level of brightness as the previous apparatus, the peak power of the laser light may be reduced so that low power consumption is realized. Moreover, with the projection apparatus 11, the vertical scanning frequency may be increased by making short the blanking interval, thereby being able to increase the frame frequency.

The present technology may be also in the following structures.

(1) A drive control apparatus, including:
   a horizontal control section configured to control a scanning mirror for horizontal scanning with laser light, the scanning mirror being driven at a fixed frequency in a horizontal direction; and
   a vertical control section configured to control the scanning mirror for vertical scanning based on the frequency at which the horizontal control section drives the scanning mirror in the horizontal direction, the vertical control section outputting a vertical drive signal to control the scanning mirror for the vertical scanning, the vertical drive signal including an interval in which the laser light is directed vertically from top to bottom and an interval in which the laser light is directed vertically from bottom to top, the intervals alternately producing an output of a predetermined amount.

(2) The drive control apparatus according to (1), in which
   on the vertical drive signal that is output by the vertical control section to control the scanning mirror for the vertical scanning, processing is performed to enable video display on a frame basis alternately in the intervals in the vertical drive signal, in the intervals, the laser light being directed vertically from top to bottom and from bottom to top.

(3) The drive control apparatus according to (1) or (2), in which
   the vertical drive signal has a waveform showing approximately a same slope in the intervals in which the laser light is directed vertically from top to bottom and from bottom to top.

(4) The drive control apparatus according to any of (1) to (3), in which
   the waveform of the vertical drive signal is trapezoidal that includes a flat portion between the intervals in which the laser light is directed vertically from top to bottom and from bottom to top.

(5) The drive control apparatus according to any of (1) to (4), in which
   the waveform of the vertical drive signal is triangular that shows a direct change, like forming a vertex, from the slope in the interval in which the laser light is directed vertically from top to bottom to the slope in the interval in which the laser light is directed vertically from bottom to top.

(6) The drive control apparatus according to any of (1) to (5), in which in the waveform of the vertical drive signal, the slope in the interval in which the laser light is directed vertically from top to bottom forms a smooth curve to change to the slope in the interval in which the laser light is directed vertically from bottom to top.

(7) The drive control apparatus according to any of (1) to (6), in which the vertical drive signal has a trapezoidal waveform that includes a flat portion between the intervals in which the laser light is directed vertically from top to bottom and from bottom to top, and a slope in the interval in which the laser light is directed vertically from top to bottom is different from a slope in the interval in which the laser light is directed vertically from bottom to top.

(8) The drive control apparatus according to any of (1) to (7), in which the vertical control section stores drive waveform data created in advance for generating the vertical drive signal, the drive waveform data being sequentially read for generating the vertical drive signal based on the frequency at which the scanning mirror is horizontally driven.

(9) The drive control apparatus according to any of (1) to (8), in which in the trapezoidal waveform of the vertical drive signal, the vertical control section increases or decreases an interval being the flat portion to establish synchronization between two frame cycles, one of the frame cycles being of incoming video, and the other of the frame cycles being based on the frequency at which the scanning mirror is horizontally driven.

(10) The drive control apparatus according to any of (1) to (9), in which in the waveform of the vertical drive signal, a resonance component of the scanning mirror is removed from portions being close to ends of the flat portion.

(11) The drive control apparatus according to any of (1) to (10), in which the waveform of the vertical drive signal has a shape of driving the scanning mirror in a direction that is opposite to a moving direction of the scanning mirror, the scanning mirror being driven at a portion where the flat portion starts.

(12) The drive control apparatus according to any of (1) to (11), in which the vertical control section measures a delay when processing is performed on a signal that indicates a vertical angle of the scanning mirror, the delay being used as a basis to change a timing when to generate the vertical drive signal from the drive waveform data.

(13) The drive control apparatus according to any of (1) to (12), in which the vertical control section controls the scanning mirror for the vertical scanning to have an interval between the intervals in which the laser light is directed vertically from top to bottom and from bottom to top, the scanning mirror not moving in a vertical direction in the interval.

The foregoing description of the embodiment is in all aspects illustrative and not restrictive. It is understood that numerous other modifications and variations may be devised without departing from the scope of the present disclosure.

What is claimed is:

1. A drive control apparatus comprising:

a horizontal control section configured to control a scanning mirror for horizontal scanning with laser light, the scanning mirror being driven at a fixed frequency in a horizontal direction; and a vertical control section configured to control the scanning mirror for vertical scanning based on the frequency at which the horizontal control section drives the scanning mirror in the horizontal direction, the vertical control section outputting a vertical drive signal to control the scanning mirror for the vertical scanning, the vertical drive signal including an interval in which the laser light is directed vertically from top to bottom and an interval in which the laser light is directed vertically from bottom to top, the intervals alternately producing an output of a predetermined amount, wherein on the vertical drive signal that is output by the vertical control section to control the scanning mirror for the vertical scanning, processing is performed to enable video display on a frame basis alternately in the intervals in the vertical drive signal, in the intervals, the laser light being directed vertically from top to bottom and from bottom to top, wherein the vertical control section measures a delay when processing is performed on a signal that indicates a vertical angle of the scanning mirror, the delay being used as a basis to change a timing when to generate the vertical drive signal from the drive waveform data, and wherein the vertical drive signal has a waveform showing approximately a same slope in the intervals in which the laser light is directed vertically from top to bottom and from bottom to top.

2. The drive control apparatus according to claim 1, wherein the waveform of the vertical drive signal is trapezoidal that includes a flat portion between the intervals in which the laser light is directed vertically from top to bottom and from bottom to top.

3. The drive control apparatus according to claim 2, wherein in the trapezoidal waveform of the vertical drive signal, the vertical control section increases or decreases an interval being the flat portion to establish synchronization between two frame cycles, one of the frame cycles being of incoming video, and the other of the frame cycles being based on the frequency at which the scanning mirror is horizontally driven.

4. The drive control apparatus according to claim 2, wherein in the waveform of the vertical drive signal, a resonance component of the scanning mirror is removed from portions being close to ends of the flat portion.

5. The drive control apparatus according to claim 2, wherein the waveform of the vertical drive signal has a shape of driving the scanning mirror in a direction that is opposite to a moving direction of the scanning mirror, the scanning mirror being driven at a portion where the flat portion starts.

6. The drive control apparatus according to claim 1, wherein
the waveform of the vertical drive signal is triangular that shows a direct change, like forming a vertex, from the slope in the interval in which the laser light is directed vertically from top to bottom to the slope in the interval in which the laser light is directed vertically from bottom to top.

7. The drive control apparatus according to claim 1, wherein
in the waveform of the vertical drive signal, the slope in the interval in which the laser light is directed vertically from top to bottom forms a smooth curve to change to the slope in the interval in which the laser light is directed vertically from bottom to top.

8. The drive control apparatus according to claim 1, wherein
the vertical drive signal has a trapezoidal waveform that includes a flat portion between the intervals in which the laser light is directed vertically from top to bottom and from bottom to top, and a slope in the interval in which the laser light is directed vertically from top to bottom is different from a slope in the interval in which the laser light is directed vertically from bottom to top.

9. The drive control apparatus according to claim 1, wherein
the vertical control section stores drive waveform data created in advance for generating the vertical drive signal, the drive waveform data being sequentially read for generating the vertical drive signal based on the frequency at which the scanning mirror is horizontally driven.

10. The drive control apparatus according to claim 1, wherein
the vertical control section controls the scanning mirror for the vertical scanning to have an interval between the intervals in which the laser light is directed vertically from top to bottom and from bottom to top, the scanning mirror not moving in a vertical direction in the interval.

11. A video output apparatus, comprising:
the drive control apparatus according to claim 1;
a laser light source configured to generate the laser light; and
a scanning mirror configured to reflect the laser light coming from the laser light source, the laser light being used for two-dimensional scanning.

* * * * *